Patented July 3, 1951

2,559,171

UNITED STATES PATENT OFFICE 2,559,171

UNSATURATED ETHER ESTERS

John Robert Roach and Harold Wittcoff, Minneapolis, Minn., assignors to General Mills, Inc., a corporation of Delaware No Drawing. Application January 4, 1946, Serial No. 639,159

7 Claims. (Cl. 260—410.7)

The present invention relates to novel ether esters of polyhydroxy compounds in which the ether group contains an unsaturated hydrocarbon radical and the ester group contains any of a variety of acid groups. The invention is especially directed to polyhydric alcohols which have been partially etherified with short chain unsaturated hydrocarbon groups such as vinyl, allyl, etc., and subsequently esterified with any of a wide variety of acids, preferably fatty acids of the drying or semi-drying oil type or acids of the type derived from the oxidation of petroleum or other hydrocarbon products. The invention also relates to polymers of these ether esters.

It is known that unsaturated ether type compounds can be caused to polymerize to yield highly desirable polymeric substances. There is, however, at times a tendency for such polymers to display a brittle character requiring the addition of a plasticizer. In the case of the compounds herein disclosed, however, a very desirable type of internal plasticization takes place. The extent of esterification can be controlled so that any desired amount of plasticization will be obtained. Thus films or sheets produced from polymerized monomers of the type described herein are practically always highly flexible and possess the desirable properties ordinarily observed in allyl ether type polymers, such as excellent wear resistance, durability, hardness, infusibility, insolubility, and resistance to water, alkali, acid, various other chemicals, and heat.

The present compounds possess an additional advantage in the great variation in acid radicals which is possible. Thus, if one uses drying oil or semi-drying oil acids, as is often desirable, the characteristics of those radicals impart valuable properties to the polymerizability of the molecule, serving not only to plasticize the product but also to add unsaturation of the drying oil type which enhances the unsaturation of the hydrocarbon radical. Thus it is seen by combining the unsaturation of the etherifying hydrocarbon radical with the unsaturation of drying oil or semi-drying oil types, two types of polymerization occur simultaneously, and thus the advantageous features of each type are combined. Furthermore, by controlling the ratio of the ester and ether groups, any desired combination of properties may be obtained.

A further and very important advantage of the present compounds is the large increase in viscosity which these materials may undergo prior to gelation. Thus ether esters of the type herein described may be increased in viscosity up to 600 or more centistokes at 98° C. prior to gelation. Moreover, this increase in viscosity may be obtained in a relatively short period of time. As compared with this, certain allyl esters heretofore known have merely doubled in viscosity even after prolonged subjection to polymerization conditions. It will be apparent that by selection of the proper acid and by controlling the degree of polymerization of the resulting ether ester, it is possible to obtain a polymeric material which imparts the desired viscosity to protective and decorative coating compositions.

It is, therefore, an object of the present invention to provide novel derivatives of polyhydric alcohols in which a portion of the hydroxyls are etherified with unsaturated hydrocarbon residues and another portion of the hydroxyls are esterified with acid radials of varying types. It is a further object of the invention to provide ether ester derivatives of polyhydric alcohols in which the ether group is of the allyl or substituted allyl type, or of the vinyl or substituted vinyl type, and in which the esterifying acids are derived from drying oil acids, semi-drying oil acids, non-drying oil acids, or high molecular weight acids derived by oxidation of hydrocarbon materials such as petroleum. It is a still further object of the invention to provide an ether ester of the type above described which is capable of polymerization to high viscosities without gelation. It is another object of the present invention to provide novel ether esters of the type described which are characterized by internal plasticization and capability of forming films of excellent wear resistance, durability, hardness, infusibility, insolubility, and resistance to water, alkali, acid, various chemicals, and heat.

These and other objects of the invention will be more fully apparent from the following description.

The compounds are prepared in general by esterifying a partially etherified polyhydric alcohol with acids or acid derivatives under the usual conditions of esterification known in the art. The polyhydric alcohols employed may include many diverse types such as glycerol, sorbitol, mannitol, sucrose, glucosides, starch, cellulose, pentaerythritol; the condensation products of ketones with formaldehyde such as 2,2,6,6-tetrahydroxymethylcyclohexanol; 2,2,6,6 - tetrahydroxymethylpyranol-1; 2,2,6-trihydroxymethyl-6-methylpyranol-1; and the like. The etherifying agent may be in any form conventionally used for etherification, such as the halide, sulfate, or similarly reactive derivative which contains an unsaturated carbon to carbon linkage in an aliphatic chain not in excess of ten carbon atoms such as vinyl, allyl, methallyl, ethylallyl, cinnamyl, crotyl, chloroallyl, chlorocrotyl, propargyl, methylvinylcarbinyl, tiglyl, isopropenylvinylcarbinyl, divinylcarbinyl, 2,4-hexadiene-1-yl, 2-methyl-2-hexene-1-yl, and 1-butene-4-yl. The fatty acid groups employed for esterification may be derived from any of the aliphatic or substituted aliphatic acids irrespective of chain length or degree of unsaturation, or may be derived from any of the aromatic or substituted aromatic acids, or from any of the cyclo-aliphatic acids or substituted cyclo-aliphatic acids.

The partial etherification of these products can be carried out in diverse ways, and in general can be controlled to give any desired degree of etherification. When an allyl halide is used as the etherifying agent, it can be caused to react slowly with a mixture of the polyhydric alcohol and strong alkali such as 50% sodium hydroxide. In general for more complete etherification it is desirable to use an excess of unsaturated halide and an excess of alkali, preferably about two equivalents of halide and an even larger excess of alkali. If a lower degree of etherification is desired this may be attained by employing less of the etherifying reagents. Likewise, the order of addition may be reversed so that the strong alkali is added slowly to a mixture of the halide and the polyhydric alcohol. By controlling temperature conditions, length of reaction time, and ratio of reagents, the degree of etherification can be controlled.

In general, these etherification mixtures are heterogeneous and accordingly, efficient stirring means which promotes more intimate contact between the phases, increases the speed of reaction. In some instances it is desirable to employ a suitable solvent in which the two phases are soluble, in order to promote the reaction.

In some instances, of course, special reactions may be resorted to in order to obtain the desired compound. Thus monoallylglycerol results from the interaction of glycerol monochlorohydrin with allyl alcohol, and similarly diallylglycerol results from the interaction of glycerol dichlorohydrin with allyl alcohol.

In those instances where the etherifying agent is insufficiently reactive or is too volatile under the conditions described above, as for example allyl chloride, more drastic conditions may be employed, such as the use of elevated temperatures, in an autoclave. In certain cases it may be advisable to employ indirect means of etherification. For example, vinyl ethers may be obtained from the interaction of the polyhydric alcohol and acetylene in the presence of sodium hydroxide or a suitable catalyst.

After the desired partially etherified material has been obtained, the esterification can be accomplished by reacting this product with an acid halide or anhydride according to known procedures. Likewise the free acid may be used for esterification. Thus, if one chooses for esterification, a fatty acid such as stearic acid or the acids from soybean, linseed, oiticia, perilla, cottonseed, or olive oil, etc., the partially etherified material may be mixed with a stoichiometric quantity of the acid and these may be caused to react by heating, preferably in an inert atmosphere, with agitation at a temperature of 180° C. to 250° C. for two to six hours. Of course, azeotropic methods of esterification, as well as any other type of esterification procedure known to the art, may be employed.

It is not necessary to use pure polyhydric alcohols for the preparation of these new materials. Thus the mixture of polyhydric alcohols which results when a ketone or other carbonyl containing compound is caused to condense with formaldehyde may be etherified to any desired extent and then esterified. Such condensations are commonly carried out with an alkaline catalyst such as calcium hydroxide. Etherification can be effected under alkaline conditions, and it has been found desirable to utilize the crude condensation mixture including the alkaline catalyst, as pointed out in our copending application, Serial No. 639,158, filed of even date herewith. Patent No. 2,483,739.

These new ether ester monomers may be pure compounds or mixtures thereof depending upon the starting material and reaction conditions. They are in general clear liquids which range in color from water-white to yellow. They are miscible with a great variety of organic solvents such as acetone, alcohols, chloroform, dioxane, benzene, xylene, various types of ethers, paraffins, hydrocarbons, etc.

These monomers may be used for a multiplicity of purposes such as solvents for various polymers, paint, varnish, enamel, lacquer, and other types of protective compositions and plasticizers for various cellulose derivatives and other types of derivatives. In particular, however, the products are found to polymerize to yield highly desirable polymers either spontaneously or in the presence of such catalysts as heat, light, ultraviolet radiation, oxygen, ozone, peroxides such as benzoyl or lauryl peroxide, and metallic driers such as lead, cobalt, manganese, nickel, iron, etc., which are generally used in the form of their fat soluble salts such as stearates or naphthenates in order to accelerate the polymerization of protective coating films.

The products of polymerization vary somewhat in physical properties depending on the molecular structure of the monomer employed, on the extent of polymerization, and on the method used to effect it. The polymers, however, are nearly always clear and transparent and, when completely polymerized, are substantially insoluble and infusible and possessed of a high degree of inherent flexibility and plasticization. It is evident that intermediate polymers having a wide variety of properties may be obtained.

The monomers may be polymerized to yield two general types of products. The first of these is a highly viscous polymer which is obtained when polymerization is carried to a degree short of gelation. These viscous polymers may be incorporated into suitable compositions to obtain excellent protective coatings, such as varnishes, enamels, and lacquers. Thus, whereas the ordinary protective coating is susceptible to the corrosive or deleterious effects of chemicals, alkali, acid, or heat, these new compositions are extremely resistant to such agents. The preparation of these protective coatings may be accomplished by the incorporation of the fusible, soluble and viscous polymer with the substances ordinarily employed in the protective coating industry. Pigmentation may be effected by the use of inorganic pigments such as zinc oxide, titanium oxide, etc., or by the use of organic dyes. Furthermore useful products may be obtained by impregnation of inert substances such as bran, oat hulls, alpha-cellulose, leather, paper, wood, or other comparatively porous substances with the fusible polymer or a mixture containing it along with a metallic drier or a peroxide, such as benzoyl peroxide, after which the product may be cured or molded under heat and pressure to form an object which has good physical properties.

The second type of product obtained by polymerization is a somewhat thermoplastic material which may be molded to a hard infusible polymer by the usual procedures. Upon the initial polymerization of the monomeric unsaturated ether esters or solutions of these in suitable solvents by means of heating, exposure to air or oxygen, or other similar device, a marked increase in the viscosity as has already been indicated is noted due to the formation of a polymer which has good solubility characteristics. This viscosity has been observed to increase up to 500 to 600 or more centistokes at 98° C. without danger of gelation. As has already been indicated, the ability to attain such high viscosities and to control the viscosity of the fusible polymer is extremely important in certain applications. Still further polymerization causes the liquid to set to a soft gel which contains a substantial portion of a polymer which is insoluble in the monomer and in organic solvents, and which ordinarily contains soluble material which probably is a mixture of monomer and soluble, fusible polymers. These gels are soft and fragile and tear and crumble on the application of stress. They may be further polymerized then to the final infusible, insoluble state in which all the polymer is substantially infusible and insoluble in organic solvents, acids, and alkalies.

When the polymerization is stopped short of gelation, the efficacy of the transparent, highly viscous material in protective coatings may be judged by casting a film of the product on glass, wood, or metal panels. In general, this is best accomplished by dissolving the material in chloroform or some other suitable solvent. If desired, a metallic drier such as lead, manganese, cobalt, iron, etc., in the form of the naphthenate or stearate, etc., or a peroxide such as benzoyl peroxide, may be added. This, however, is by no means necessary although in the absense of a polymerization catalyst, it is necessary to bake the film at a temperature of 70° C. or slightly higher in order to obtain a hard film in a reasonable length of time. The solution is then cast into a film on glass, and where metallic drier or other such polymerization catalyst is present, a few hours at room temperature is sufficient to cause formation of a smooth, hard, clear, transparent coating which for all practical purposes is entirely insoluble and infusible. It adheres with marked tenacity to glass, wood, and metal, and is amazingly resistant to heat, alkali, acid, water, and other chemicals. Furthermore, there is demonstrated, as has been indicated previously, a high degree of flexibility and plasticization which greatly enhances the value of the coating.

In order to prevent the highly viscous, fusible polymer from polymerizing still further to form a gel, the polymerization must be interrupted. This may be effected by cooling with the addition of a suitable solvent in which the partially polymerized polymer is very stable. Further polymerization may likewise be prevented until so desired, by the addition of an inhibitor such as pyrogallol. It is this partially polymerized, highly viscous liquid which may be incorporated into lacquer, enamel, and varnish and other protective coating compositions in order to yield highly resistant films. Of course, heat may be employed in order to accelerate the formation of the insoluble, infusible and resistant film.

The time of polymerization of the highly viscous liquid to an infusible and insoluble film is, of course, largely a function of temperature. At temperatures between 70–100° C., however, the time desired is extremely short which makes these products particularly desirable in protective coatings which are baked or heat cured. In the use of these unsaturated ethers in molding compositions various procedures may be followed. Thus the compounds themselves may be cast polymerized to form products having various shapes. These polymers in their finally cured state are substantially infusible and insoluble, and in general, demonstrate excellent wear-resistance and durability.

Likewise, as indicated above, an intermediate state of polymerization may be attained in which the product is soluble in such organic solvents as acetone, carbon tetrachloride, chloroform, benzene, etc. In this state of polymerization the products are truly thermoplastic and may be polymerized further to an infusible state to yield products similar to those mentioned in the preceding paragraph, that is, the fusible polymer may be molded or otherwise shaped and polymerized by means of heat to form highly resistant and permanently shaped products.

The fusible polymer likewise may be subjected to still another procedure which is highly advantageous and which involves removing a portion or all of the monomer and recovering the fusible polymer substantially free from monomer or at least containing much less monomer than is normally present in the monomer-polymer mixture referred to herein as the fusible polymer. The fusible polymer from which the monomer has been removed may then be extruded, molded, shaped, or otherwise worked into desirable forms and after final shaping the products may be cured or completely hardened and rendered infusible by any of the suitable methods involving heat and/or catalysts.

The fractionation of the highly viscous liquid, that is, the removal of the monomer, may be effected by various procedures. Thus the monomer may be extracted with a solvent in which the polymer is insoluble such as petroleum ether. Correspondingly, the mixtures may be dissolved in a suitable solvent such as chloroform after which the fusible polymer is precipitated by addition of a non-solvent for the polymer such as petroleum ether. The fusible polymers so produced are characteristically thermoplastic, soluble in such solvents as chloroform, benzene, acetone, dioxane, etc., and soften or flow on heating. They are precipitated as whilte amorphous powders or as plastic semi-liquid resins from solutions by the addition of non-solvents.

It should be mentioned that a partially fusible polymer may be obtained from the gelled polymer simply by treating the gel with a solvent such as methyl or ethyl alcohol. Thus the monomer and soluble polymer present is dissolved and the gel swells considerably. Thereafter, it may be dried and powdered to yield a fusible polymer which can be cured according to the procedures indicated above.

A large number of inert substances may be incorporated with the fusible polymer before subjecting it to the molding condition. These may include fillers, natural or synthetic resins, pigments, organic dyestuffs, etc.

*Example 1*

In an appropriate vessel equipped with agitator and reflux condenser were placed 392 parts of cyclohexanone, 660 parts of formaldehyde in the form of paraformaldehyde, 3500 parts of water, and 112 parts of calcium oxide. With stirring the temperature of the solution rose spontaneously to 55° C., whereupon the exothermic nature of the reaction was checked by external cooling. Thereafter the reaction mixture was heated and stirred at 50–55° C. for two hours. The reaction mixture, after having been acidified to Congo Red paper with dilute sulfuric acid, was filtered and desolvated to yield a sirup which crystallized readily in titturation with alcohol. Crystallization from absolute alcohol yielded 2,2,6,6-tetramethylolcyclohexanol with a melting point of 130–131° C.

The partial allyl ether of 2,2,6,6-tetramethylolcyclohexanol was prepared by dispersing 55 parts of the polyhydric alcohol in 168 parts of 50% aqueous sodium hydroxide at room temperature. Thereupon the temperature was raised to approximately 72° C., whereupon the reaction mixture changed to a thick gel which was difficult to stir. The dropwise addition, however, of 240 parts of allyl bromide caused the reaction mixture to become stirrable, and at the end of the addition of the allyl bromide which required approximately four hours, the reaction mixture consisted of an oily layer composed of the desired allyl ether of 2,2,6,6-tetramethylolcyclohexanol and excess allyl bromide and a lower aqueous alkaline layer in which was suspended crystalline sodium bromide. After complete addition of the etherifying reagent the well-stirred mixture was heated for two hours at 75–80° C. at which time the mixture was cooled and the oily layer of desired allyl derivative was extracted with ethyl ether. The extract having been washed with slightly acidified water and then with pure water was dried over anhydrous sodium sulfate and desolvated to obtain the product which was distilled at 167–180° C. at 1.3 mm. This product possessed an iodine number of 226 and an hydroxyl percentage which indicated the presence of 3.36 allyl groups and 1.64 hydroxyl groups.

A mixture of 200 parts of this partially allylated material with 256 parts of soybean acids was treated with 10 parts of calcium stearate and 200 parts of xylene. The reaction mixture was stirred and heated at 170–220° C. for three hours or until a low acid number was obtained. There resulted a product which was a light yellow fluid oil which could be polymerized to yield films which were infusible and insoluble, fairly hard, clear, and transparent, and which were possessed of a high degree of plasticization.

Example 2

Allyl alcohol (1161 parts) and 880 parts of 50% aqueous sodium hydroxide were mixed with a resulting temperature rise to 52° C. Upon heating the mixture to 70° C., 644.8 parts of glycerol dichlorohydrin was added dropwise over a 3.25 hour period, during which time the exothermic nature of the reaction was sufficient to keep the temperature at 70° C. After the addition, the reaction was continued for another 1.25 hours and then a large portion of the excess allyl alcohol and part of the water were removed by distillation under a partial vacuum. The oily layer of diallyl glycerol was then extracted from the salt solution and after a number of washings was distilled in vacuo; boiling point 112–113° C. at 14 mm. A small amount of what is probably a diglycerol derivative was obtained with a boiling point of 185–193° C. at 14 mm.

A reaction mixture consisting of 258 parts of diallyl glycerol, 410 parts of linseed fatty acids, 200 parts of xylene and 10 parts of calcium stearate was heated and stirred under nitrogen at 225–230° C. for six hours. There resulted a clear fluid liquid which had the following properties:

| | |
|---|---|
| Hydroxyl number | 1.7 |
| Acid number | 4.4 |
| Viscosity (Gardner) | less than A |
| Color (Gardner) | 9–10 |
| Specific gravity 25/25 | 0.9217 |
| Iodine number | 198.1 |

This product likewise was capable of being polymerized to yield a polymer of the desirable characteristics indicated previously.

Example 3

A mixture of 1161 parts of allyl alcohol and 616 parts of 50% aqueous NaOH was placed in a flask (warmed up to 52° C. during the mixing) and 773.5 parts of glycerol monochlorohydrin was added dropwise over a 4.25 hour period. During the addition of the latter reagent, the reaction mixture was maintained at 70° C. Following one more hour of heating, the mixture was neutralized to phenolphthalein with acetic acid and the excess allyl alcohol and water were removed by distillation under a partial vacuum. The monoallyl glycerol was then separated from crystalline sodium bromide and distilled in vacuo; boiling point 124° C. at 12 mm., $n_d^{25°}=1.4602$, Iodine number=205.3. A smaller amount of a higher boiling constituent was obtained, which is probably a partially allylated ether of diglycerol, and which distilled at 166–180° C. at 14 mm.

264 parts of monoallyl glycerol was treated with 1100 parts of linseed acids, 250 parts of xylene and 10 parts of calcium stearate. The reaction mixture was heated and stirred at 180–230° C. for a period of five hours, whereupon there was obtained a clear fluid with the following physical characteristics:

| | |
|---|---|
| Hydroxyl number | 12.8 |
| Acid number | 2.8 |
| Iodine number | 176.9 |
| Color (Gardner) | 13–14 |
| Viscosity (Gardner) | less than A |
| Specific gravity (25/25) | 0.9318 |

Example 4

Glycerol (92 parts) and 528 parts of 50% aqueous sodium hydroxide were mixed and heated to approximately 73° C. This this solution was then added dropwise 725 parts of allyl bromide over a five hour period. The reaction was continued two more hours at the reflux temperature of allyl bromide and then the oily layer of partially allylated allyl glycerol was extracted with ether and distilled after numerous washings. The product distilled 117–124° C. at 19 mm. and had an iodine number 335.8 and an hydroxyl percentage indicating 2.6 allyl groups.

A mixture of 196 parts of this partially allylated glycerol with 111 parts of linseed fatty acids was heated with stirring in an inert atmosphere of nitrogen for five hours at 200–230° C. There resulted a fluid, transparent oil which was capable of undergoing polymerization to yield the highly desirable polymers described above.

Example 5

A coating composition can be prepared by the partial polymerization of any of the mixed etheresters disclosed or suggested by disclosures in this application. For example, the mixed diallyl ether-linseed oil fatty acid ester of glycerol was polymerized in 7.5 hours to a viscosity of approximately 400 centistokes at 98° C. by passing oxygen through the mixture at a rate of 6.8 liters/hrs. at 98° C. By continuing the polymerization another half hour an exceedingly viscous polymer was obtained which still had not gelled and which was still soluble in the usual organic solvents. Films prepared from a chloroform solution of this polymer possessed good physical properties and were less brittle than straight allyl polymeric films.

*Example 6*

In a manner similar to that in Example 5, the soybean fatty acid ester of partially allylated tetramethylolcyclohexanol was polymerized to a viscosity of 430 centistokes at 98° C. in six hours. A higher viscosity could have been attained easily. This polymeric material formed a film which dried in two hours or less at 130° C. in the absence of catalyst. As in the above example, the polymer gave a flexible film.

While various modifications of the invention have been described it will be apparent that other variations are possible without departing from the spirit of the invention as pointed out in the appended claims.

We claim as our invention:

1. An ether ester of a polyhydric alcohol, said ether ester having the following formula:

$$(RCOO)_m R'(OR^2)_n$$

where RCOO is the acyl group of an unsaturated higher fatty acid; R' is the residue of a polyhydric alcohol having at least three hydroxyl groups; R² is an unsaturated hydrocarbon radical having not more than ten carbon atoms in length; m and n are whole numbers and the sum of m and n is substantially to the number of hydroxyl groups in the polyhydric alcohol from which R' is derived.

2. An ether ester of a polyhydric alcohol, said ether ester having the following formula:

$$(RCOO)_m R'(OR^2)_n$$

where RCOO is the acyl group of a monobasic organic acid; R' is the residue of a polyhydric alcohol derived by condensation of a carbonyl-containing compound with formaldehyde; R² is an unsaturated hydrocarbon radical having not more than ten carbon atoms in length; m and n are whole numbers and the sum of m and n is substantially equal to the number of hydroxyl groups in the polyhydric alcohol from which R' is derived.

3. An ether ester of glycerol, said ether ester having the following formula:

$$(RCOO)_m R'(OR^2)_n$$

where RCOO is the acyl group of an unsaturated higher fatty acid; R' is the glycerol residue; R² is an unsaturated hydrocarbon radical having not more than ten carbons in length; m and n are whole numbers and the sum of m and n is equal to 3.

4. An etherester of a polyhydric alcohol, said ether ester having the following formula:

$$(RCOO)_m R'(OR^2)_n$$

where RCOO is the acyl group of an unsaturated higher fatty acid; R' is the residue of a carbohydrate or carbohydrate derivative free from an active carbonyl group; R² is an unsaturated hydrocarbon radical having not more than ten carbon atoms in length; m and n are whole numbers and the sum of m and n is substantially equal to the number of hydroxyl groups in the polyhydric alcohol from which R' is derived.

5. An ether ester according to claim 1 in which R² is an allyl or substituted allyl group.

6. An ether ester according to claim 1 in which R² is a crotyl or substituted crotyl group.

7. An ether ester according to claim 1 in which R² is a vinyl or substituted vinyl group.

JOHN ROBERT ROACH.
HAROLD WITTCOFF.

REFERENCES CITED

The following references are of record in the file of this patent:

UNITED STATES PATENTS

| Number | Name | Date |
|---|---|---|
| 1,739,315 | Kessler | Dec. 10, 1929 |
| 2,010,560 | North | Aug. 6, 1935 |
| 2,152,683 | Eichwald | Apr. 4, 1939 |
| 2,378,827 | Bradley | June 19, 1945 |
| 2,399,214 | Evans | Apr. 30, 1946 |
| 2,426,913 | Adelson et al. | Sept. 2, 1947 |